Feb. 5, 1946.     O. L. STARR     2,394,408
PISTON RING AND EXPANDER MEANS THEREFOR
Filed Feb. 2, 1942     3 Sheets-Sheet 3
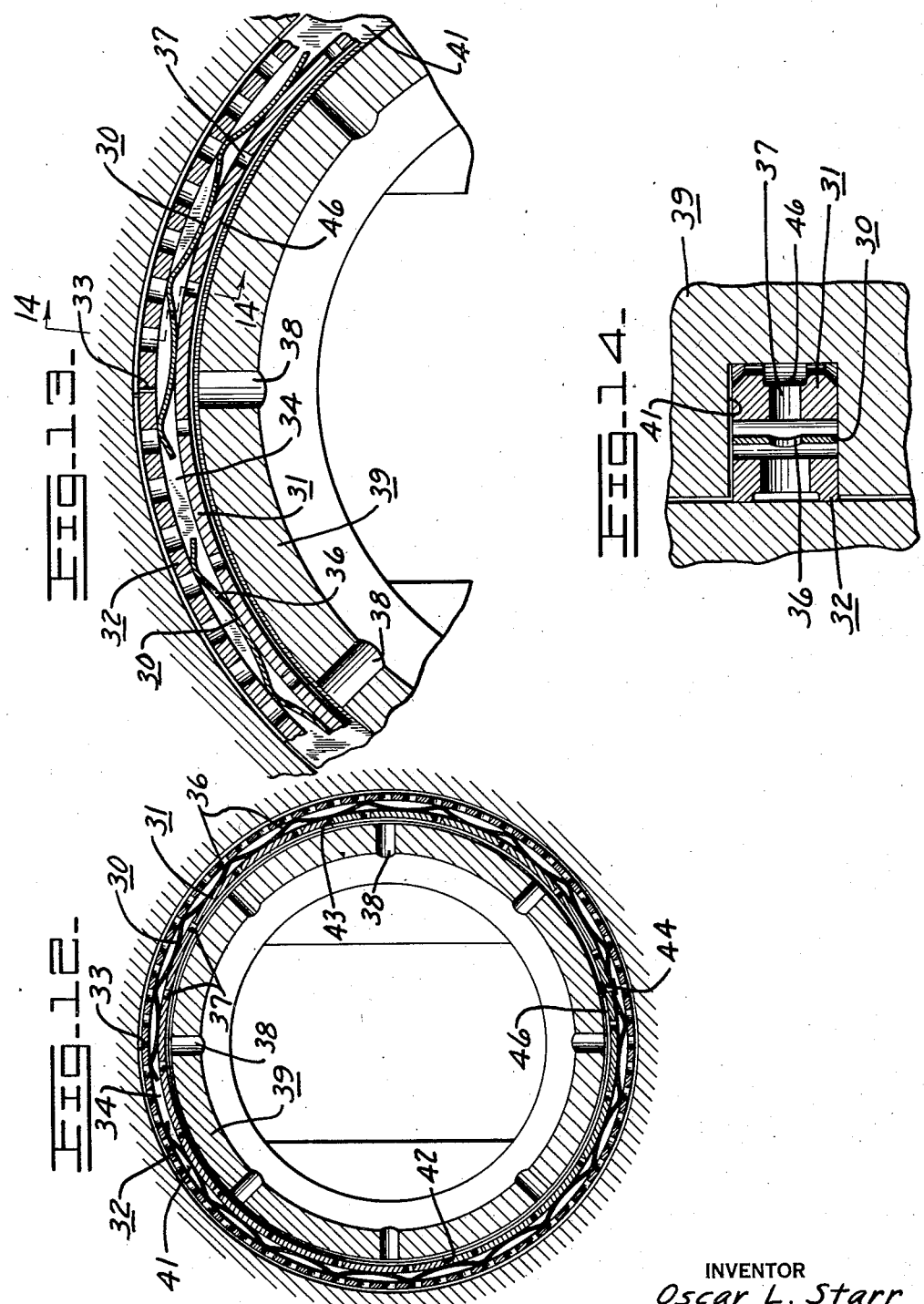
INVENTOR
Oscar L. Starr
BY Charles M. Fryer
ATTORNEY Patented Feb. 5, 1946

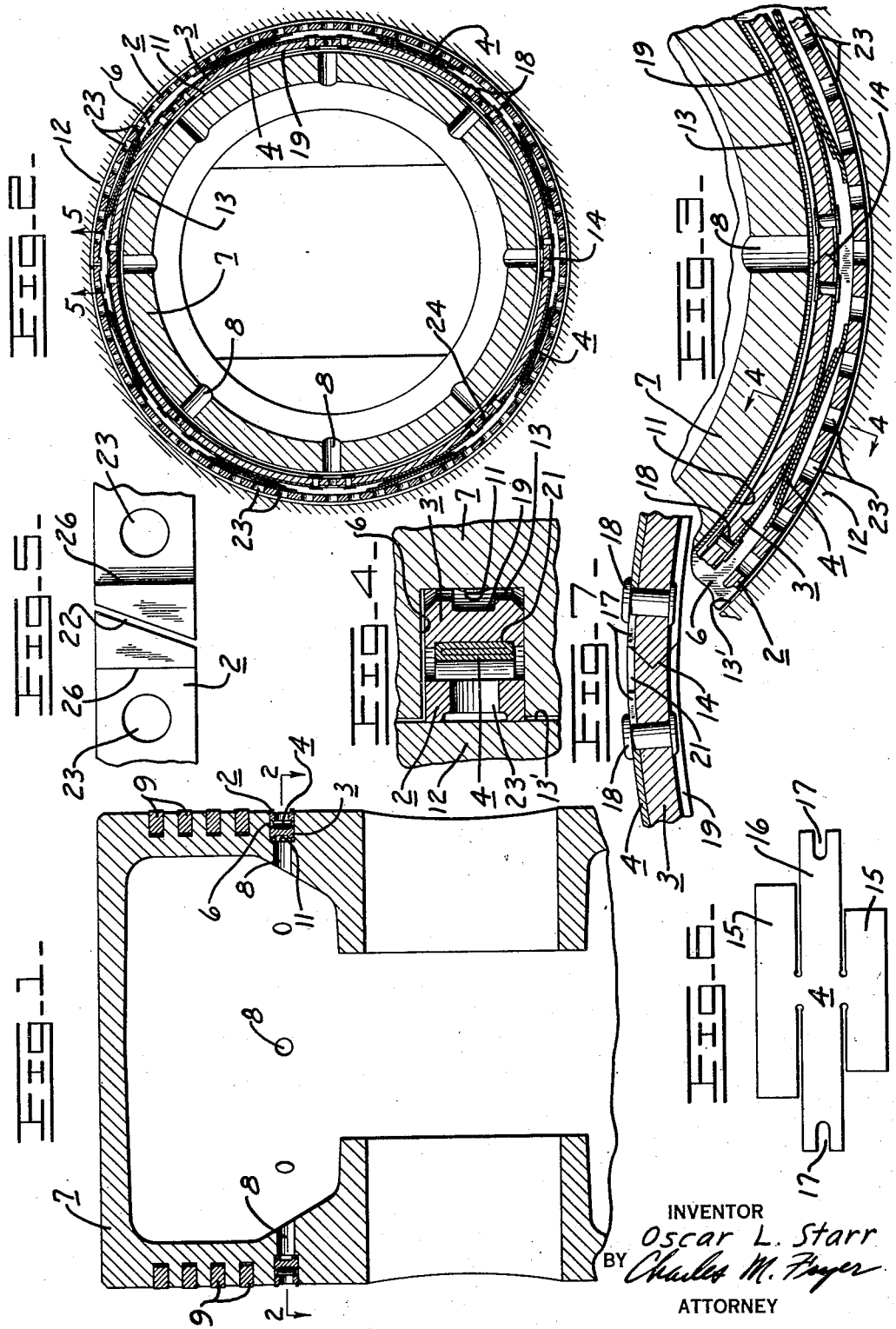

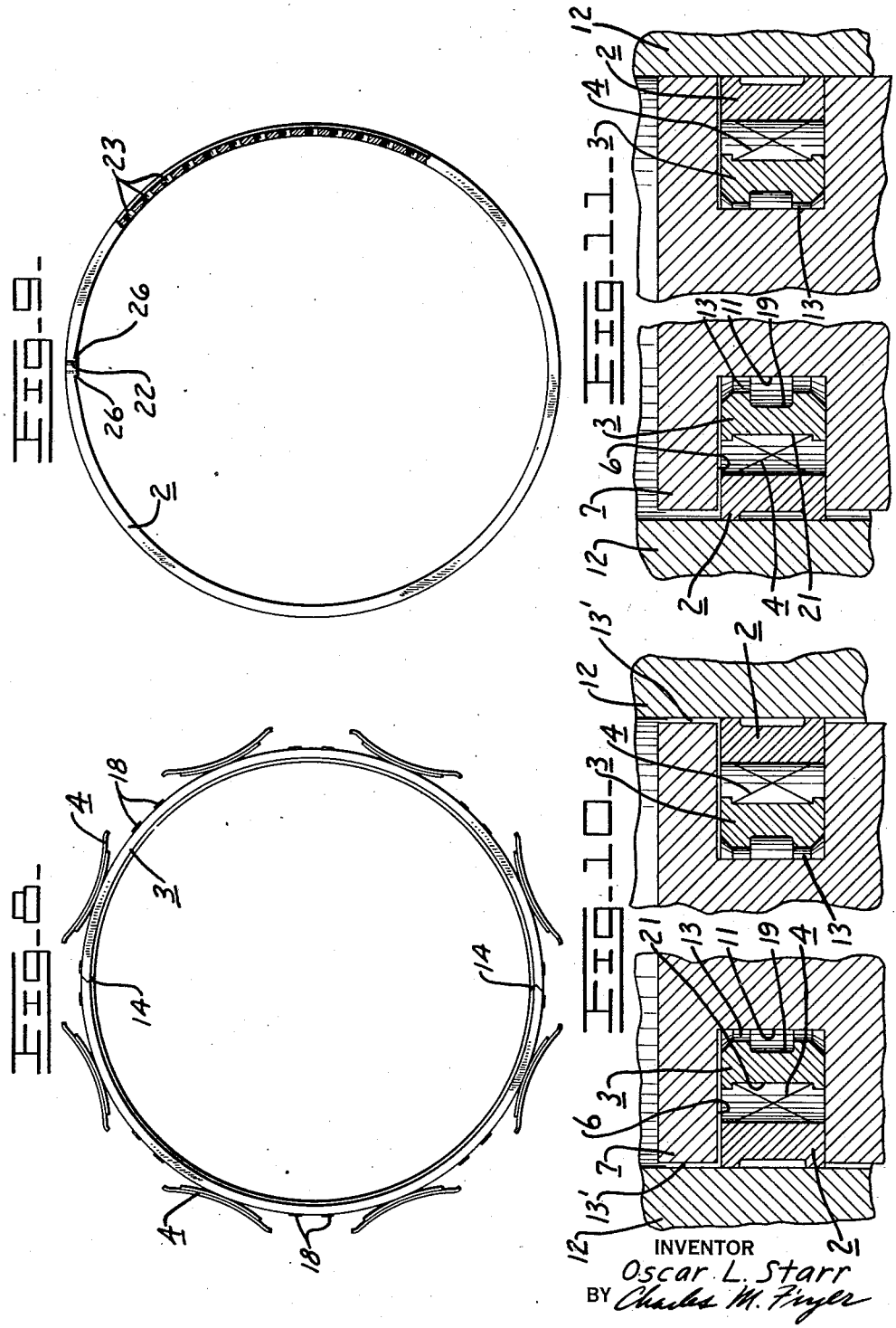

2,394,408

UNITED STATES PATENT OFFICE 2,394,408

PISTON RING AND EXPANDER MEANS THEREFOR

Oscar L. Starr, Mission San Jose, Calif., assignor to Caterpillar Tractor Co., San Leandro, Calif., a corporation of California Application February 2, 1942, Serial No. 429,262

1 Claim. (Cl. 309—45)

My invention relates to piston rings, and more particularly to a piston ring construction, and expander means therefor, adapted for internal combustion engine pistons.

With respect to a piston ring with which expander means is employed to apply pressure to the ring so as to seal it against a cylinder wall, it has heretofore been the commercial practice to have such expander means abut against the root of the piston ring groove in which the ring is adapted to be mounted. Such type of mounting is not all to be desired because as a piston works in a cylinder it has lateral movement from one side to the other, which increases as wear occurs. Such lateral movement causes the piston to influence the pressure applied by the expander means against the ring, by virtue of the abutting contact between the root of the piston ring groove and the expander means. As a result, pressure applied by the expander means will be more concentrated at some areas along the periphery of the ring, than at other areas, causing unequal wear of the cylinder wall and the ring, and uneven sealing between the ring and the cylinder wall.

It has also been customary to construct a piston ring so as to have inherent stress when mounted on a piston within a cylinder, whereby the ring is self-energized for sealing against the cylinder wall. This is accomplished by providing a relatively wide gap between the adjacent ends of the ring, so that in the unstressed condition thereof, it is of larger size than the size of the cylinder in which the ring is adapted to work. As a result, when the ring is mounted on a piston positioned within a cylinder wall, the adjacent ends of the ring are compressed or forced together, causing the ring to be under expanding stress, and thereby seal against such wall. However, the sealing pressure exerted by the ring will not be equal about the entire periphery of the ring, which will result in unequal wear of the cylinder wall and the ring, and uneven sealing between the ring and the wall.

My invention is designed to overcome the above described problems, and has as its objects among others, the provision of an improved piston ring and improved expander means therefor; which will provide correct and accurate form of the ring, and uniform pressure application of the ring against a cylinder wall, to thereby enhance uniform sealing between the ring and the wall, and also equalize as well as minimize wear; are of economical construction and easy to assemble; and which possess a relatively long life.

Other objects of my invention will become apparent from a perusal of the following description thereof.

In general, I provide a piston ring assembly including a piston ring, and expander means therefor comprising an inner abutment ring and resilient means between the abutment ring and the piston ring, to render outward or radial application of pressure on the piston ring free of influence by the piston. This is accomplished by having the inside diameter of the abutment ring greater than the diameter of the root of the piston ring groove in which the assembly is adapted to be mounted; so that during working of the piston, the abutment ring of the assembly will not come in contact with the root of the groove. Thus, the piston may move laterally or radially with respect to the piston ring assembly during working of the piston in the cylinder, without influencing the pressure forces applied by the expander means to the piston ring. Preferably, the piston ring of such assembly has an unstressed shape which conforms substantially to the configuration of the cylinder wall against which the ring is adapted to seal. As a result, the ring will have no inherent expanding force or stress for sealing against the cylinder wall; and the expander means, which is designed to apply pressure uniformly to the ring, will cause the ring to seal uniformly against the cylinder wall, with even wear between the wall and the ring as the piston works in the cylinder. Reference is now made to the drawings for a more detailed description of my invention, in which:

Fig. 1 is a vertical cross sectional view of one form of piston ring assembly of my invention, mounted on an internal combustion engine piston which is also shown in vertical cross section.

Fig. 2 is a horizontal section taken in a plane indicated by line 2—2 in Fig. 1; a cylinder wall being illustrated in section about the ring.

Fig. 3 is an enlarged fragmentary horizontal section of a portion of the construction illustrated in Fig. 2.

Fig. 4 is a vertical section taken in a plane indicated by line 4—4 in Fig. 3.

Fig. 5 is an end elevation of the piston ring at its joint, taken in a plane indicated by line 5—5 in Fig. 2.

Fig. 6 is a plan view illustrating a form of blank from which resilient means, forming a part of the expander means of my piston ring assembly, is made.

Fig. 7 is a fragmentary horizontal section illustrating a form of joint construction in the carrier or abutment ring forming part of the expander means of my piston ring assembly.

Fig. 8 is a plan view of such abutment or carrier ring.

Fig. 9 is a plan view, partly in section, of the preferred non-stressed piston ring forming part of my assembly.

Figs. 10 and 11 are enlarged vertical sectional, schematic views illustrating different radial or lateral positions of my piston ring assembly with respect to a piston on which it is mounted, as such piston assumes different lateral positions with respect to a cylinder wall in which it is adapted to work, the views being broken away in the middle to shorten them.

Fig. 12 is a horizontal section of another form of piston ring assembly of my invention, mounted on an internal combustion engine piston which is also shown in horizontal section; a cylinder wall being illustrated in section about the ring.

Fig. 13 is an enlarged fragmentary horizontal section of a portion of the construction illustrated in Fig. 12.

Fig. 14 is a vertical section taken in planes indicated by line 14—14 in Fig. 13.

A form of assembly of my invention comprises outer split piston ring 2 of any suitable material, such as cast iron, and expander means adapted to be enclosed thereby, which includes an inner abutment ring 3 of any suitable material, such as steel, and resilient means 4 between the piston ring and the abutment ring. The type of ring for which my invention is particularly adapted, is an oil ring having apertures to permit passage of oil therethrough and which is usually provided with an outer peripheral channel, but my invention may be also employed in conjunction with a full faced compression or any other shaped ring, if the occasion arises. As can be seen more clearly from Fig. 1, the assembly is adapted to be mounted in piston ring groove 6 formed in internal combustion engine piston 7, and which communicates with the inside of the piston through oil return apertures 8. As is customary, a set of compression rings 9 is mounted on the piston above the oil ring assembly.

In operation or working of a piston within a cylinder wall, the forces are such as to cause the piston to move laterally or radially with respect to the cylinder wall, and the rings mounted on the piston. If the expander means were to abut against the root of the piston ring groove, then such movement of the piston would influence the pressure applied by the expander means against the piston ring by causing the expander means to become compressed to a greater extent at one side of the piston than at the opposite side thereof, depending upon the direction of lateral movement of the piston. This would result in uneven or excessive wear of the cylinder wall and the piston ring, and also inefficient or non-uniform sealing, between the piston ring and the cylinder wall.

The expander means of my invention is designed to apply radial pressure to the piston ring along its entire periphery and free of influence by the piston. For this purpose, abutment ring 3 has an inside diameter greater than the diameter of root 11 of piston ring groove 6; the clearance between root 11 and the inside of abutment ring 3 being sufficiently large, so that the abutment ring and consequently the entire assembly will be free of contact about its entire inner periphery, with root 11 when piston ring 2 seals against the cylinder wall during working of the piston. Thus, resilient means 4 of the assembly is so mounted with respect to piston ring 2, as to render its application of pressure against the ring free of influence by the piston.

With reference to Figs. 10 and 11, which illustrate schematically the functioning of the expander means principle of my invention, Fig. 10 illustrates piston 7 centrally located in a neutral position with respect to cylinder wall 12. In such position, the clearance 13 between root 11 of piston ring groove 6, and the inside of abutment ring 3 is the same throughout the entire periphery of root 11; and the clearance 13' between piston 7 and cylinder wall 12 is also the same about the entire periphery of the piston. Therefore, resilient means 4 of the assembly will cause application of pressure against piston ring 2 uninfluenced by the piston. In this connection, resilient means 4 is so distributed about the periphery of abutment ring 3 as to apply substantially uniform pressure; and abutment ring 3 is made sufficiently rigid so that it will not become radially deformed by the resilient means to the extent of contacting root 11.

During working of the piston in the cylinder, one side thereof or the other, depending upon the cycle of operation, may engage the cylinder wall 12, as is illustrated in Fig. 11. However, the clearance 13 between root 11 and the inside of abutment ring 3 is sufficiently large as was previously mentioned, to preclude contact between root 11 and the inside of abutment ring 3 even when the piston moves laterally or radially and engages the cylinder wall. Therefore, such movement of the piston with respect to the piston ring assembly will have no effect on the pressure which resilient means 4 applies against piston ring 2. Thus, the abutment ring provides, in effect, a false root for the piston ring groove. Because of the provision of an abutment ring for resilient means 4, rather than merely resilient means which by itself does not contact the root of a piston ring groove, such as a coiled spring ring, the parts may be quickly and easily assembled on a piston. Furthermore, the abutment ring permits the resilient means to be utilized with piston rings of various shapes without permitting contact of the piston ring with the root of the piston ring groove. A thin piston ring, for example, might not be able to accommodate readily a coiled spring ring. As a result, bulges might occur in such a spring, and contact of the spring with the root of the piston ring groove might occur, even though not intended.

It is to be noted from Figs. 4, 10 and 11 that abutment ring 3 as well as piston ring 2 are of less axial width than the space between the sides or lands of piston ring groove 6. Consequently, there is no frictional pressure engagement between the sides of the groove and the piston ring assembly, which if occurring would defeat the purposes of my invention because then lateral movement of the piston would result in force being imparted to abutment ring 3 in a radial direction; and this would cause varying radial pressures to be imparted to resilient means 4, causing unequal application of pressure on piston ring 2.

To facilitate mounting of the abutment ring 3 in piston ring groove 6, it is split. It is preferably split in two parts; and the joints between the parts may be interlocked at 14 to prevent possible separation of such parts, which might occur where the resilient means 4 is not unbroken substantially completely about the periphery of the abutment ring.

Any suitable form of resilient means 4 may be employed between abutment ring 3 and piston ring 2 to apply radial pressure against the piston ring to cause it to seal against the cylinder wall. For best results, such resilient means should be of such character as to apply pressure substantially uniformly along the periphery of the piston ring, so that uniform sealing may obtain between the ring and the cylinder wall. In one form of construction, I employ a plurality of substantially equally spaced leaf springs which are supported by abutment ring 3. Each of such leaf springs, as can be observed from Fig. 6, may be conveniently made from a blank of flat spring steel having side leaves 15, one of which is longer than the other, and intermediate leaf 16 adapted to be secured to the abutment ring; the intermediate leaf being provided with end notches 17 to receive suitable fastening means for securing of the spring to abutment ring 3.

The side leaves 15 for forming the spring are folded over the same side of intermediate leaf 16 of the blank, with the longer side leaf on the outside; and leaf 16 is secured to the outside of abutment ring 3 by means of suitable rivets 18 passing through the abutment ring and end notches 17. In this connection, the inner face of abutment ring 3 is formed with spaced peripheral flanges to impart rigidity to the ring; and such flanges form a groove 19 which accommodates the heads of rivets 18. Where the spring is not the same height as the abutment ring and the piston ring, the outer face of abutment ring 3 may be provided with groove 21 to receive leaf 16. A plurality of such leaf springs is provided; and the springs are spaced substantially equally about the periphery of abutment ring 3 to apply substantially uniform pressure to piston ring 2.

The principle of the expander means of my invention may be applied to any form of piston ring and provide the improved results obtainable thereby, namely, that of causing the radial spring pressure applied against the piston ring to be free of influence by the piston, thus minimizing wear and enhancing uniformity of sealing between the piston ring and the cylinder wall. For best results, I preferably employ such expander means in association with a piston ring which in its unstressed condition, conforms substantially to the configuration of the cylinder wall against which the ring is adapted to seal; so that the ring is not self-energized for sealing against the cylinder wall. Such type of ring does not seal by virtue of inherent stress, as is the case with respect to a stressable piston ring which in its unstressed condition, has a wide gap between its adjacent ends at the joint, which ends are adapted to be compressed together when the ring is fitted in the cylinder, but seals substantially solely by application of pressure applied by the expander means.

As a result, the preferred piston ring of my invention will engage the cylinder wall substantially uniformly throughout its entire periphery; and since the expander means of my invention applies substantially uniform pressure to the piston ring, substantially uniform sealing of the ring against the wall will obtain, with even and minimum wear, thus making for long life of the piston ring and the cylinder wall. Fig. 9 illustrates my preferred piston ring in its unstressed condition; and Fig. 2, which is drawn to the same scale as Fig. 9, illustrates such ring on the piston and in the cylinder wall. Since my preferred piston ring does not seal against a cylinder wall by inherent stress, it may be designated as a non-stressable ring.

Any suitable method may be employed for making such non-stressable piston ring. I prefer first to form the ring with an outside diameter slightly greater than the diameter of the cylinder in which the ring is adapted to work, and then split the ring by cutting it to form joint 22, so as to enable the ring to be sprung around the piston; joint 22 being preferably of the diagonal type, as is illustrated in Figs. 5 and 9. The slight initial oversize of the ring with respect to the cylinder wall compensates for the slight loss of material resulting from cutting of the joint, and also enables final finishing of the ring to the proper outside diameter. After cutting of the joint, the outside peripheral surface of the ring is finally finished, preferably by honing or lapping, so as to have a substantially true circular configuration of a diameter substantially the same as that of the cylinder wall against which the ring is adapted to seal.

Apertures 23 are formed in piston ring 2 to allow passage of oil therethrough; and to increase the flexibility of the ring in a radial direction and thereby enhance uniform sealing of the ring against the cylinder wall by the uniform pressure applied by the expander means, a relatively large number of relatively small, closely and substantially equally spaced apertures of substantially uniform size and shape, is provided. In this connection, it will be noted that the circumferential width of each aperture is not relatively long compared to the space between adjacent apertures. The described arrangement of the apertures, also has the additional advantage of providing ring rigidity in an axial direction so that the sides thereof will wear evenly as the ring strikes against the sides or lands of its seating groove during working of the piston. Abutment ring 3 of the expander means, is also provided with a few relatively widely spaced apertures 24 which are for the sole purpose of allowing drainage of oil and not for imparting flexibility to the ring because, as was previously mentioned, it is not desirable that abutment ring 3 be distorted radially by resilient means 4.

In mounting the described assembly of my invention on a piston, inner abutment ring 3 with springs 4 supported thereon may be first fitted in position in piston ring groove 6. Then piston ring 2 may be sprung apart and placed over the piston and about resilient means 4. Such resilient means will force apart the ends of piston ring 2 adjacent joint 22, but such ends may be manually forced together; and the entire assembly including the piston, may then be slipped into cylinder 12. To preclude piston ring 2 from being forced off the assembly by resilient means 4 during fitting, I preferably form the end portions of such ring adjacent joint 22 with shoulders 26, each of which is adapted to engage an associated end of an adjacent leaf spring 4. When the piston and the assembly of my invention are mounted within cylinder 12, the shoulders 26 will lie beyond the ends of such springs, as can be seen from Fig. 2.

In Figs. 12 through 14, I have illustrated another form of construction which is essentially the same in principle as that previously described, and which will, therefore, be described primarily with respect to its differences from such previous construction. The resilient means 30 between abutment ring 31, and piston ring 32 having split diagonal joint 33 comprises a so-called marcel spring made of suitable material, such as spring steel. It is split at 34, but the remainder of the spring is unbroken. Spring 30 is provided with suitable apertures 36 for drainage of oil which can pass therethrough, and through apertures 37 in abutment ring 31 and apertures 38 in piston 39 having piston ring groove 41 in which the entire assembly is seated; such assembly being free of frictional pressure engagement between the sides or lands of groove 41, as can be seen from Fig. 14.

Abutment ring 31 is also, preferably, split at 42 and 43 to provide two parts permitting ease of assembly; and spring 30 substantially completely embraces abutment ring 31. There is little danger of the parts of the abutment ring springing apart at joints 42 and 43 because spring 30 will hold the parts of the abutment ring together. Therefore, the parts of the abutment ring may have flat contact at joints 42 and 43. In this connection, the ends, at 34, of spring 30 are preferably assembled in staggered relationship with respect to each of joints 42 and 43 of the abutment ring to minimize any chance of such joints springing apart. To preclude possible creeping of spring 30 which might result in covering of oil drainage apertures 37, it is preferably secured to abutment ring 31 at any suitable point or points, by any suitable means, such as rivet 44, the head of which lies within a channel 46 formed in the inner periphery of the abutment ring. Such securing of spring 30 is, however, not essential.

From the preceding, it is seen that because the piston ring of my invention has substantially no inherent stress when sealed against an associated cylinder wall, and since my expander means applies pressure substantially uniformly to the piston ring, the ring will seal uniformly against the cylinder wall, which will result in even, and therefore minimum wear. Such uniform application of pressure by the expander means will not be influenced by lateral or radial movement of the piston because the root of the piston ring groove does not contact the expander means. Although, for best results, I prefer to employ both the non-stressable piston ring of my invention, and the expander means therefor which does not engage the root of the piston ring groove, such expander means may be employed with advantage in combination with a so-called stressable or self-energizable ring. Also, my preferred non-stressable piston ring construction may be employed with the type of expander means which finds its abutment on the root of the piston ring groove, because even with such arrangement, the advantages of having uniform fitting of the ring against the cylinder wall will obtain although application of pressure against such ring may vary by virtue of lateral or radial movement of the piston.

I claim:

A piston ring assembly adapted to be mounted in a piston ring groove comprising an inner ring split in a plurality of parts to fit in such groove with the adjacent ends of such parts in abutting relationship, the ring having an inside diameter greater than the diameter of the root of the groove to provide a false root and being free of frictional pressure engagement between the sides of the groove, a split outer piston ring adapted to seat between the sides of the groove, and resilient means between such rings for applying pressure to cause the piston ring to seal against a cylinder wall.

OSCAR L. STARR.